US012651962B1

(12) United States Patent

Han et al.

(10) Patent No.: US 12,651,962 B1

(45) Date of Patent: Jun. 9, 2026

(54) CONTROL CIRCUIT FOR BRIDGELESS PFC CIRCUIT, CONTROL METHOD THEREFOR, AND POWER SUPPLY SYSTEM

(71) Applicant: SHENZHEN RSPOWER TECHNOLOGY CO., LTD., Shenzhen (CN)

(72) Inventors: Shuai Han, Shenzhen (CN); Yati Chen, Shenzhen (CN); Shenghe Pan, Shenzhen (CN)

(73) Assignee: SHENZHEN RSPOWER TECHNOLOGY CO., LTD., Shenzhen (CN)

( * ) Notice: Subject to any disclaimer, the term of this patent is extended or adjusted under 35 U.S.C. 154(b) by 282 days.

(21) Appl. No.: 18/708,870

(22) PCT Filed: Sep. 8, 2023

(86) PCT No.: PCT/CN2023/117822

§ 371 (c)(1),
(2) Date: May 9, 2024

(87) PCT Pub. No.: WO2024/093528

PCT Pub. Date: May 10, 2024

(30) Foreign Application Priority Data

Oct. 31, 2022 (CN) .......................... 202211350434.5

(51) Int. Cl.
H02M 1/42 (2007.01)
H02M 7/217 (2006.01)
*H02M 1/00* (2006.01)

(52) U.S. Cl.
CPC ....... H02M 1/4233 (2013.01); H02M 1/4208 (2013.01); H02M 7/217 (2013.01); *H02M 1/0012* (2021.05)

(58) Field of Classification Search
CPC ............. H02M 1/4208; H02M 1/4283; H02M 1/4225; H02M 1/4233; H02M 1/42; H02M 1/0012; H02M 7/217
See application file for complete search history.

(56) References Cited

U.S. PATENT DOCUMENTS

2012/0051107 A1* 3/2012 Choi ................... H02M 1/4208
363/126
2012/0092910 A1* 4/2012 Sugahara ............ H02M 1/4208
363/84

(Continued)

FOREIGN PATENT DOCUMENTS

CN 101097694 A 1/2008
CN 102843025 A 12/2012

(Continued)

OTHER PUBLICATIONS

WIPO, International Search Report and Written Opinion for International Application No. PCT/CN2023/117822, Nov. 23, 2023.

(Continued)

*Primary Examiner* — Monica Lewis
*Assistant Examiner* — Jye-June Lee
(74) *Attorney, Agent, or Firm* — HAUPTMAN HAM, LLP

(57) ABSTRACT

A control circuit for a bridgeless power factor correction (PFC) circuit, a control method therefor, and a power supply system are provided. The control circuit includes a polarity determination module and a logic control module. The polarity determination module is configured to receive a sampling signal of an AC input voltage of the bridgeless PFC circuit. The polarity determination module is also configured to output a first digital signal when the sampling signal is a positive voltage signal, and output a second digital signal when the sampling signal is a negative voltage signal. The logic control module is configured to output a (Continued)

first driving signal to the bridgeless PFC circuit, when receiving the first digital signal and the preset pulse signal having a first level, and output a second driving signal to the bridgeless PFC circuit, when receiving the second digital signal and the preset pulse signal having a second level.

7 Claims, 4 Drawing Sheets

(56)                     References Cited

U.S. PATENT DOCUMENTS

| 2013/0249504 | A1 |   | 9/2013  | Hsu |           |
|--------------|----|---|---------|----------|-----------|
| 2019/0123661 | A1 | * | 4/2019  | Iyasu    | H02M 7/217 |
| 2019/0305671 | A1 | * | 10/2019 | Matsuura | H02M 1/4208 |
| 2021/0184566 | A1 | * | 6/2021  | Usami    | H02M 1/4233 |

FOREIGN PATENT DOCUMENTS

| CN | 104518656  | A   |   | 4/2015  |             |
|----|------------|-----|---|---------|-------------|
| CN | 110165883  | A   |   | 8/2019  |             |
| CN | 115201555  | A   |   | 10/2022 |             |
| EP | 2107675    | A1  | * | 10/2009 | H02M 1/4208 |
| WO | 2015051648 | A1  |   | 4/2015  |             |

OTHER PUBLICATIONS

The first office action issued in corresponding CN application No. 202211350434.5 dated Apr. 16, 2023.
Notice of allowance issued in corresponding CN application No. 202211350434.5 dated Jun. 25, 2023.

* cited by examiner

Figure 7:
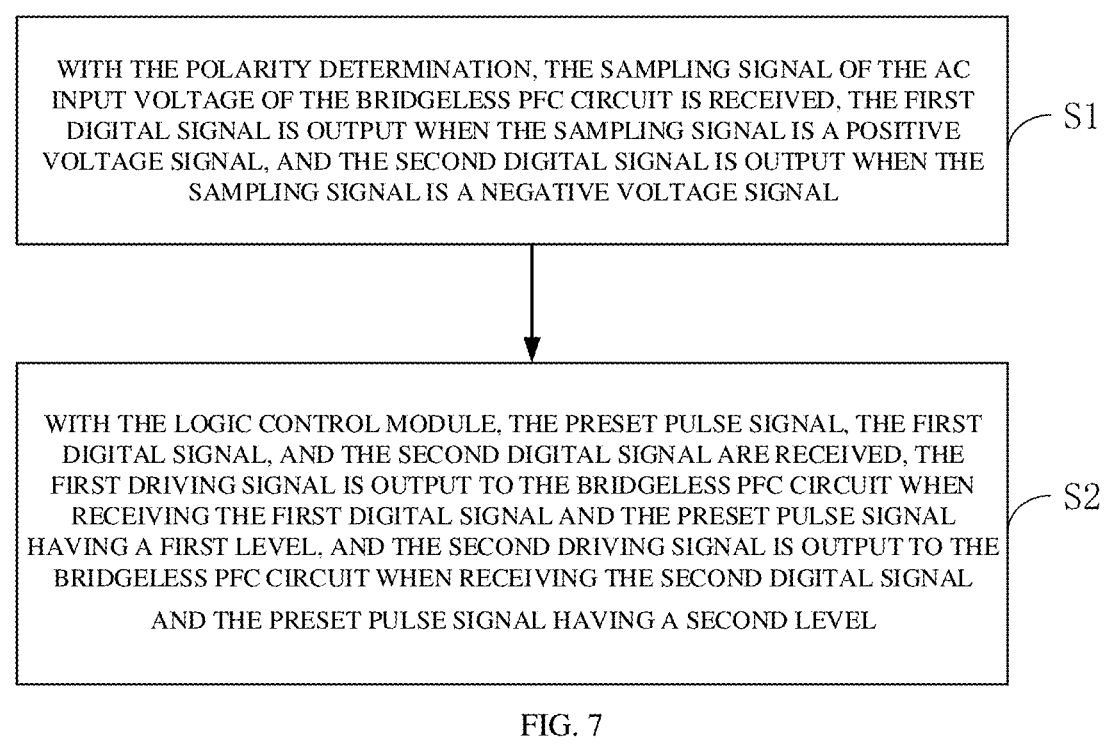

WITH THE POLARITY DETERMINATION, THE SAMPLING SIGNAL OF THE AC INPUT VOLTAGE OF THE BRIDGELESS PFC CIRCUIT IS RECEIVED, THE FIRST DIGITAL SIGNAL IS OUTPUT WHEN THE SAMPLING SIGNAL IS A POSITIVE VOLTAGE SIGNAL, AND THE SECOND DIGITAL SIGNAL IS OUTPUT WHEN THE SAMPLING SIGNAL IS A NEGATIVE VOLTAGE SIGNAL

S1

WITH THE LOGIC CONTROL MODULE, THE PRESET PULSE SIGNAL, THE FIRST DIGITAL SIGNAL, AND THE SECOND DIGITAL SIGNAL ARE RECEIVED, THE FIRST DRIVING SIGNAL IS OUTPUT TO THE BRIDGELESS PFC CIRCUIT WHEN RECEIVING THE FIRST DIGITAL SIGNAL AND THE PRESET PULSE SIGNAL HAVING A FIRST LEVEL, AND THE SECOND DRIVING SIGNAL IS OUTPUT TO THE BRIDGELESS PFC CIRCUIT WHEN RECEIVING THE SECOND DIGITAL SIGNAL AND THE PRESET PULSE SIGNAL HAVING A SECOND LEVEL

CONTROL CIRCUIT FOR BRIDGELESS PFC CIRCUIT, CONTROL METHOD THEREFOR, AND POWER SUPPLY SYSTEM

CROSS-REFERENCE TO RELATED APPLICATION(S)

This application is a National Stage of International Application No. PCT/CN2023/117822, filed Sep. 8, 2023, which claims priority to Chinese Patent Application No. 202211350434.5, filed Oct. 31, 2022, the entire disclosures of which are hereby incorporated by reference.

TECHNICAL FIELD

This disclosure relates to the technical field of circuit structure, in particular to a control circuit for a bridgeless power factor correction (PFC) circuit, a control method therefor, and a power supply system including the control circuit.

BACKGROUND

In order to improve a power factor and reduce a harmonic content of an input current, a power factor correction (PFC) circuit is mostly used for adjustment in power supply systems such as charger power supplies, electrical power supplies, communication power supplies, and server power supplies.

With the development of technology, in order to improve a conversion efficiency of a power supply, a PFC circuit has been developed from a traditional bridge PFC circuit to a bridgeless PFC circuit. However, compared to the traditional bridgeable PFC circuit that has one metal-oxide-semiconductor field-effect transistor (MOSFET), the bridgeless PFC circuit has two MOSFETs. Each of the two MOSFETs functions for about half a period in the same control period. A digital control chip corresponding to the bridgeless PFC circuit needs to distinguish different polarities of an input voltage of the bridgeless PFC circuit, so as to output different MOSFET driving signals to drive a corresponding MOSFET, which results in a complex algorithm of the digital control chip, and thus reducing a response speed of the bridgeless PFC circuit.

SUMMARY

The present disclosure is intended to at least solve one of the technical problems in the related art. To this end, the present disclosure provides a control circuit for a bridgeless power factor correction (PFC) circuit, a control method therefor, and a power supply system. In the case where the control circuit is applied to a power supply system including the bridgeless PFC circuit, a control algorithm of a digital control chip corresponding to the bridgeless PFC circuit can be simplified, thereby improving a response speed of the bridgeless PFC circuit. In addition, the control circuit is simple in structure and is highly reliable.

In order to achieve the above purpose, in a first aspect, the disclosure provides a control circuit for a bridgeless PFC circuit. The bridgeless PFC circuit includes a first bridge arm, the first bridge arm includes a first switch transistor and a second switch transistor that are connected in series. The control circuit includes a polarity determination module and a logic control module. The polarity determination module is configured to receive a sampling signal of an alternating current (AC) input voltage of the bridgeless PFC circuit. The polarity determination module is also configured to output a first digital signal when the sampling signal is a positive voltage signal, and output a second digital signal when the sampling signal is a negative voltage signal. A level polarity of the first digital signal is opposite to a level polarity of the second digital signal. The logic control module is configured to receive a preset pulse signal, the first digital signal, and the second digital signal. The logic control module is also configured to output a first driving signal to the bridgeless PFC circuit, when receiving the first digital signal and the preset pulse signal having a first level, and output a second driving signal to the bridgeless PFC circuit, when receiving the second digital signal and the preset pulse signal having a second level. The first driving signal is used for controlling one of the first switch transistor and the second switch transistor to be turned on, and the second driving signal is used for controlling the other of the first switch transistor and the second switch transistor to be turned on. The first level is opposite to the second level, and a changing period of the first level and the second level are the same as a changing period of a polarity of the AC input voltage.

In a second aspect, the disclosure provides a control method for a bridgeless PFC circuit. The control method is applied to the above-mentioned control circuit, and the control method includes the following. Receiving, with the polarity determination module, the sampling signal of the AC input voltage of the bridgeless PFC circuit, outputting the first digital signal when the sampling signal is a positive voltage signal, and outputting the second digital signal when the sampling signal is a negative voltage signal. The level polarity of the first digital signal is opposite to the level polarity of the second digital signal. Receiving, with the logic control module, the preset pulse signal, the first digital signal, and the second digital signal, outputting the first driving signal to the bridgeless PFC circuit when receiving the first digital signal and the preset pulse signal having the first level, and outputting the second driving signal to the bridgeless PFC circuit when receiving the second digital signal and the preset pulse signal having the second level. The first driving signal is used for controlling one of the first switch transistor and the second switch transistor of the bridgeless PFC circuit to be turned on, and the second driving signal is used for controlling the other of the first switch transistor and the second switch transistor to be turned on. The first level is opposite to the second level, and the first level and the second level change periodically.

In a third aspect, the disclosure provides a power supply system, including a bridgeless PFC circuit, a sampling circuit, a digital control chip, and the above-mentioned control circuit. The sampling circuit is configured to collect the sampling signal of the AC input voltage of the bridgeless PFC circuit and send the sampling signal to the polarity determination module. The digital control chip is configured to generate the preset pulse signal and send the preset pulse signal to the logic control module.

Compared to the related art, the present disclosure has the following beneficial effects. In the control circuit provided in embodiments of the disclosure, by receiving the sampling signal of an AC input voltage AC of the bridgeless PFC circuit and the preset pulse signal having a level that can change periodically according to the changing period of the polarity of the AC input voltage AC, the polarity of the AC input voltage AC can be determined automatically, and different driving signals are output to the bridgeless PFC circuit according to different polarities of the AC input voltage AC. In this way, the first switch transistor Q1 and the second switch transistor Q2 in the bridgeless PFC circuit can be controlled to be alternately turned on, and the bridgeless PFC circuit can operate normally. Not only the control algorithm of the digital control chip corresponding to the bridgeless PFC circuit can be simplified so as to improve the response speed of the bridgeless PFC circuit, but also the control circuit only includes the polarity determination module and the logic control module, which is simple in structure and is highly reliable.

Additional aspects and advantages of the disclosure will be partially provided in the following description, which will become apparent from the following description, or will be understood through the practice of the disclosure.

BRIEF DESCRIPTION OF THE DRAWINGS

In order to describe technical solutions in embodiments of the disclosure more clearly, the following will give a brief introduction to the accompanying drawings required for describing the embodiments. Apparently, the accompanying drawings hereinafter described are merely some embodiments of the disclosure. Based on these drawings, those of ordinary skill in the art can also obtain other drawings without creative effort.

FIG. 7 is a flow chart of a control method for a bridgeless PFC circuit provided in the disclosure.

Figure 1:
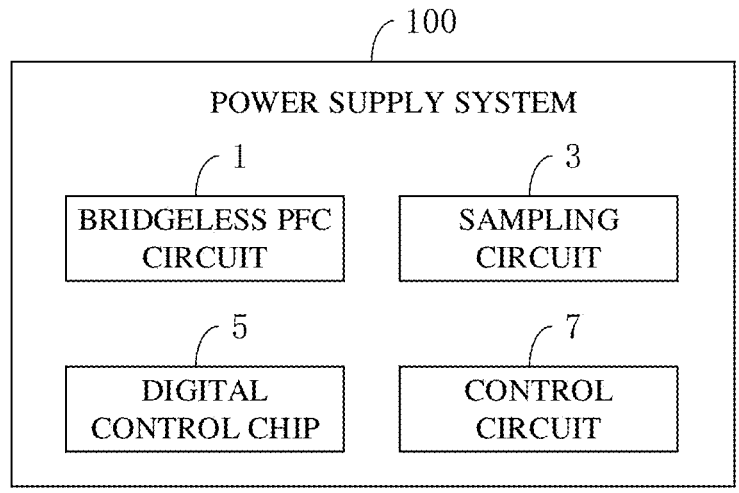
FIG. 1 is a structural block diagram of a power supply system provided in an embodiment of the disclosure.

The following specific embodiments will further describe the disclosure in combination of the accompanying drawings.

DETAILED DESCRIPTION

The following will describe embodiments of the disclosure in detail, and examples of embodiments herein will be illustrated in the accompanying drawings, in which the same or similar reference numerals denote the same or similar components or components having the same or similar functions throughout the context. Embodiments described hereinafter with reference to the accompanying drawings are illustrative and intended for explaining, rather than limiting, the present disclosure.

Reference is made to FIG. 1, the disclosure provides a power supply system 100, including a bridgeless power factor correction (PFC) circuit 1, a sampling circuit 3, a digital control chip 5, and a control circuit 7. The power supply system 100 may be but is not limited to digital power supply systems including a bridgeless PFC circuit, for example, a charger power supply, an electrical power supply, a communication power supply, and a server power supply.

Figure 2:
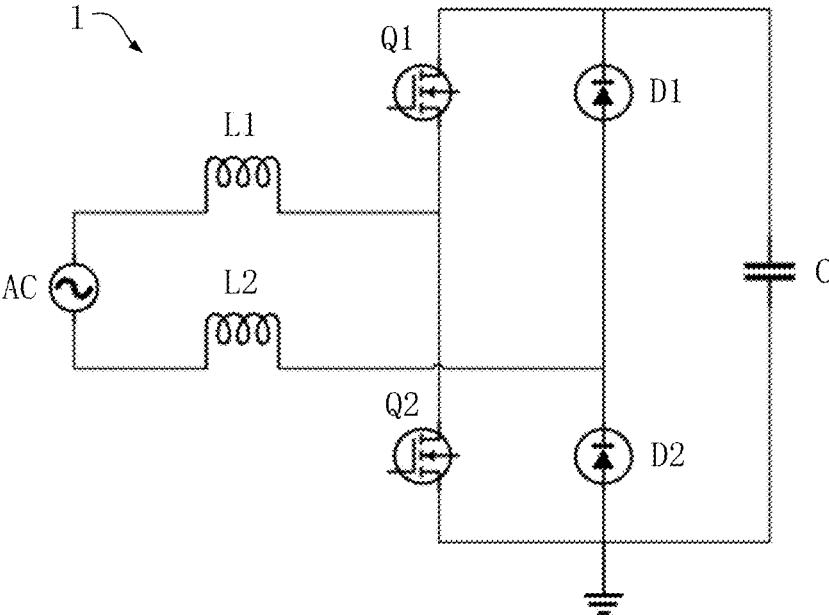
FIG. 2 is a diagram of a circuit structure of a bridgeless power factor correction (PFC) circuit provided in an embodiment of the disclosure.

Specifically, reference is made to FIG. 2, in an embodiment of the disclosure, the bridgeless PFC circuit 1 may include an alternating current (AC) input voltage AC, a first inductor L1, a second inductor L2, a first switch transistor Q1, a second switch transistor Q2, a first diode D1, a second diode D2, and an output capacitor C. The first switch transistor Q1 and the second switch transistor Q2 are connected in series to form a first bridge arm, and a common node between the first switch transistor Q1 and the second switch transistor Q2 is coupled to one end of the AC input voltage AC through the first inductor L1. The first diode D1 and the second diode D2 are connected in series to form a second bridge arm, and a common node between the first diode D1 and the second diode D2 is coupled to the other end of the AC input voltage AC through the second inductor L2. The first bridge arm and the second bridge arm are connected in parallel. One end of the output capacitor C is connected to one end of the second bridge arm, and the other end of the output capacitor C is connected to the other end of the second bridge arm. Generally, one end of the output capacitor C is connected to one end of a load and the other end of the output capacitor C is connected to the other end of the load (not shown in the drawings). However, in other embodiments, the first diode D1 and the second diode D2 may be replaced by other suitable switch transistors, for example, metal-oxide-semiconductor field-effect transistors (MOSFET), which is not limited herein. It is known to those of ordinary skill in the art that the first switch transistor Q1 and the second switch transistor Q2 each functions for about half a period in the same control period respectively. That is, the first switch transistor Q1 and the second switch transistor Q2 are respectively controlled by pulse driving signals having opposite level polarities that change periodically. In this way, the first switch transistor Q1 and the second switch transistor Q2 are alternately turned on, so as to implement functions of the bridgeless PFC circuit 1. It can be understood that, a working principle of the bridgeless PFC circuit 1 is the same as a working principle of a bridgeless PFC circuit in the related art, which will not be repeated herein.

It should be noted that, in embodiments of the disclosure, the sampling circuit 3 is configured to collect a sampling signal of the AC input voltage AC of the bridgeless PFC circuit 1 and send the sampling signal to the control circuit 7. The digital control chip 5 is configured to generate a preset pulse signal and send the preset pulse signal to the control circuit 7. In this way, the control circuit 7 can output a corresponding driving signal to the bridgeless PFC circuit 1 based on the received sampling signal and the preset pulse signal, so as to control the first switch transistor Q1 and the second switch transistor Q2 to be alternately turned on.

The sampling circuit 3 may be any existing sampling circuit as long as it can sample the AC input voltage AC of the bridgeless PFC circuit 3, which will not be limited herein. The digital control chip 5 may be but is not limited to, a microcontroller unit (MCU) control chip or a singlechip as long as it can generate the preset pulse signal having a level that changes periodically, which will not be limited herein.

Figure 3:
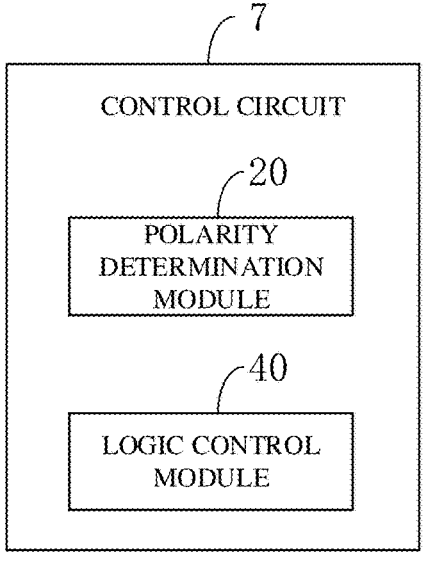
FIG. 3 is a structural block diagram of a control circuit provided in an embodiment of the disclosure.
Figure 4:
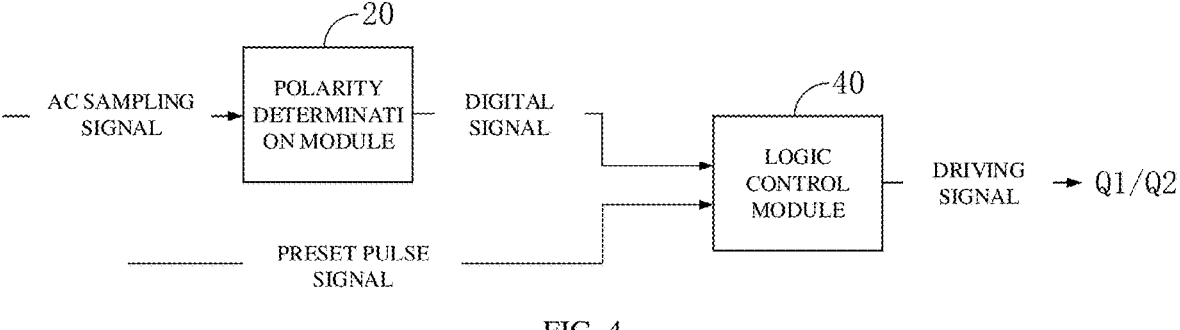
FIG. 4 is a diagram of a working principle of the control circuit illustrated in FIG. 3.

Reference is made to FIG. 3 and FIG. 4, in embodiments of the disclosure, the control circuit 7 includes a polarity determination module 20 and a logic control module 40.

The polarity determination module 20 is configured to receive the sampling signal of the AC input voltage AC of the bridgeless PFC circuit 1 collected by the sampling circuit 3, and output a digital signal representing a voltage polarity of the AC input voltage AC. Specifically, the polarity determination module 20 is configured to output a first digital signal when the sampling signal is a positive voltage signal, and the polarity determination module 20 is configured to output a second digital signal when the sampling signal is a negative voltage signal. A level polarity of the first digital signal is opposite to a level polarity of the second digital signal. For example, the first digital signal is a high level signal and the second digital signal is a low level signal, or the first digital signal is a low level signal and the second digital signal is a high level signal.

The control module 40 is configured to receive the digital signal output by the polarity determination module 20 and the preset pulse signal sent by the digital control chip 5, and then output a corresponding driving signal to control the first switch transistor Q1 and the second switch transistor Q2 to be alternately turned on. Specifically, the logic control module 40 is configured to output a first driving signal to the bridgeless PFC circuit 1, when receiving the first digital signal and the preset pulse signal having a first level, and the logic control module 40 is configured to output a second driving signal to the bridgeless PFC circuit 1, when receiving the second digital signal and the preset pulse signal having a second level. The first driving signal is used for controlling one of the first switch transistor Q1 and the second switch transistor Q2 to be turned on. The second driving signal is used for controlling the other of the first switch transistor Q1 and the second switch transistor Q2 to be turned on. The first level is opposite to the second level, and a changing period of the first level and the second level are the same as a changing period of a polarity of the AC input voltage AC.

In the embodiments of the disclosure, since the first digital signal and the second digital signal output by the polarity determination module 20 are associated with the polarity of the AC input voltage AC of the bridgeless PFC circuit 1, i.e., the polarity determination module 20 can periodically output the first digital signal and the second digital signal according to the changing of the polarity of the AC input voltage AC, and the logic control module 40 receives the first digital signal and the second digital signal periodically. Moreover, the level (namely, the first level and the second level) of the preset pulse signal changes periodically, and the changing period of the first level and the second level is the same as the changing period of the polarity of the AC input voltage AC. Therefore, the logic control module 40 periodically outputs the first driving signal and the second driving signal according to the received preset pulse signal and the digital signal (the first digital signal or the second digital signal). The first driving signal and the second driving signal are used for respectively controlling different switch transistors in the bridgeless PFC circuit 1 to be turned on. That is, the control circuit 7 can output different driving signals to separately control different switch transistors in the bridgeless PFC circuit 1 to be turned on alternately, enabling the bridgeless PFC circuit 1 to operate normally.

In the related art, a digital control chip is used to distinguish a polarity of an AC input voltage of a bridgeless PFC circuit, so as to output different driving signals to drive different switch transistors of the bridgeless PFC circuit to be turned on. However, this may lead to a relatively complex algorism of the digital control chip and may reduce a response speed of the bridgeless PFC circuit. In contrast, in embodiments of the disclosure, the control circuit 7 receives the sampling signal of the AC input voltage AC of the bridgeless PFC circuit 1 collected by the sampling circuit 3 and the preset pulse signal generated by the digital control chip 5. In this way, the polarity of the AC input voltage AC of the bridgeless PFC circuit 1 can be determined automatically, and different driving signals are output to the bridgeless PFC circuit 1 according to different polarities of the AC input voltage AC. In this way, the first switch transistor Q1 and the second switch transistor Q2 in the bridgeless PFC circuit 1 can be controlled to be alternately turned on, and the bridgeless PFC circuit 1 can operate normally. Not only the control algorithm of the digital control chip 5 corresponding to the bridgeless PFC circuit 1 can be simplified so as to improve the response speed of the bridgeless PFC circuit 1, but also the control circuit 7 only includes the polarity determination module 20 and the logic control module 40, which is simple in structure and is highly reliable.

As mentioned above, the first switch transistor Q1 and the second switch transistor Q2 of the bridgeless PFC circuit 1 are respectively controlled by pulse driving signals having opposite level polarities that change periodically, so that the first switch transistor Q1 and the second switch transistor Q2 can be turned on alternately. In embodiments of the disclosure, the first switch transistor Q1 is turned on under control of a driving signal having a high level and the second switch transistor Q2 is turned on under control of a driving signal having a low level.

Optionally, in a possible embodiment, when the first digital signal has a low level and the first level is a low level (i.e., the preset pulse signal has a low level), the logic control module 40 outputs the first driving signal to control the second switch transistor Q2 to be turned on. When the second digital signal has a high level and the second level is a high level (i.e., the preset pulse signal has a high level), the logic control module 40 outputs the second driving signal to control the first switch transistor Q1 to be turned on. In this way, the first switch transistor Q1 and the second switch transistor Q2 can be turned on alternately.

Figure 5:
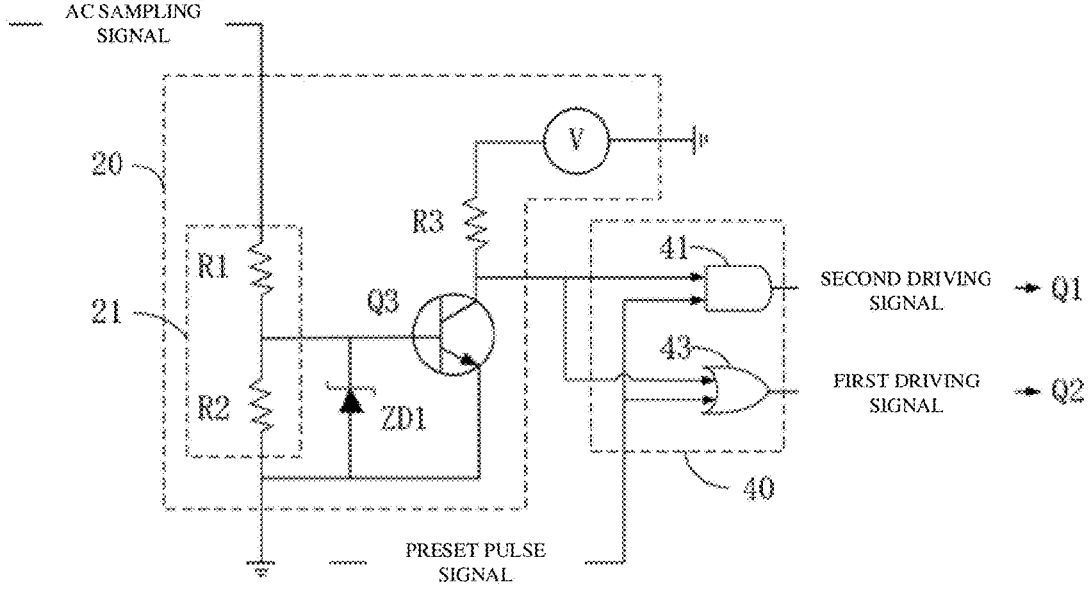
FIG. 5 is a diagram of a circuit structure of the control circuit illustrated in FIG. 3 in an embodiment.

Specifically, reference is made to FIG. 5, in an embodiment of the disclosure, the polarity determination module 20 may include a voltage division circuit 21, a third switch transistor Q3, and a power supply V.

As illustrated in FIG. 5, the voltage division circuit 21 has a first connection end configured to receive the sampling signal, and has a second connection end for grounding. The voltage division circuit 21 includes a voltage division element. In the embodiment illustrated in FIG. 5, the voltage division circuit 21 includes a first resistor R1 and a second resistor R2 that are connected in series. One end of the first resistor R1 is configured to receive the sampling signal, and one end of the second resistor R2 is for grounding. The second resistor R2 is the voltage division element. However, in other embodiments, the voltage division circuit 21 may include multiple resistors connected in series. The voltage division element is one of the ungrounded resistor among the multiple resistors, or the voltage division element is at least two adjacent resistors among the multiple resistors, which is not limited herein.

As illustrated in FIG. 5, the third switch transistor Q3 includes a control electrode, a first conduction electrode, and a second conduction electrode. The control electrode is connected to a first connection end (the end that is connected to the sampling signal) of the voltage division element and the first conduction electrode is connected to a second connection end (the end that is grounded) of the voltage division element. The power supply V is connected between the second conduction electrode and the ground, and a connection node between the power supply V and the second conduction electrode is connected to the logic control module 40.

The third switch transistor Q3 may be but is not limited to switch elements such as a triode, a MOSFET, and the like. In the embodiment illustrated in FIG. 5, the third switch transistor Q3 is a triode.

In this embodiment, when the sampling signal is a positive voltage signal, a voltage between two opposite ends of the voltage division element may be higher than a voltage of a turn-on threshold of the third switch transistor Q3. In this case, the third switch transistor Q3 is turned on, and the voltage of the power supply V may be directed to the ground through the turned-on third switch transistor Q3, and thus a low level signal may be output at the connection node between the power supply V and the second conduction electrode to the logic control module 40. The low-level signal is the first digital signal. On the contrary, when the sampling signal is a negative voltage signal, the voltage between two opposite ends of the voltage division element may be lower than the voltage of the turn-on threshold of the third switch transistor Q3. In this case, the third switch transistor Q3 is cut off, and the voltage of the power supply V may not be directed to the ground through the cut-off third switch transistor Q3, and thus a high level signal may be output at the connection node between the power supply V and the second conduction electrode to the logic control module 40. The high-level signal is the second digital signal.

It may be understood that, the voltage between two opposite ends of the voltage division element is inversely proportional to the number of resistors in the voltage division circuit 21, that is, the larger the number of resistors in the voltage division circuit 21, the lower the voltage between two opposite ends of the voltage division element. By reasonably designing the number of resistors in the voltage division circuit 21, the voltage between two opposite ends of the voltage division element can be controlled, so as to prevent the third switch transistor Q3 from being broken down due to a high voltage between two opposite ends of the voltage division element. Preferably, in the embodiment illustrated in FIG. 5, the polarity determination module 20 further includes a voltage regulator ZD1. The voltage regulator ZD1 has a first voltage end connected between the first connection end of the voltage division element and the control electrode of the third switch transistor Q3. The voltage regulator ZD1 has a second voltage end connected between the second connection end of the voltage division element and the first conduction electrode of the third switch transistor Q3. In this way, a voltage of the control electrode of the third switch transistor Q3 is clamped by the voltage regulator ZD1, so that the third switch transistor Q3 can be protected and prevented from being broken down due to a high voltage.

Further preferably, in the embodiment illustrated in FIG. 5, the polarity determination module 20 also includes a current-limiting element. The current-limiting element is connected between the power supply V and the second conduction electrode of the third switch transistor Q3 for the purpose of limiting the current. In doing this, when the voltage of the power supply V flows to the ground through the third switch transistor Q3, the third switch transistor Q3 can be prevented from being broken down due to a high current. The current-limiting element may be but is not limited to current-limiting elements such as a current-limiting resistor, a diode, etc. In the embodiment illustrated in FIG. 5, the current-limiting element is a third resistor R3. However, in other embodiments, the third switch transistor Q3 can be protected by controlling the voltage of the power supply V without arranging the current-limiting element.

Reference is again made to FIG. 5, in an embodiment of the disclosure, the logic control module 40 may specifically include a first AND gate circuit 41 and an OR gate circuit 43. One input end of the first AND gate circuit 41 and one input end of the OR gate circuit 43 are connected to the connection node between the power supply V and the second conduction electrode of the third switch transistor Q3, and the other input end of the first AND gate circuit 41 and the other input end of the OR gate circuit 43 are configured to receive the preset pulse signal. An output end of the first AND gate circuit 41 is connected to the first switch transistor Q1, and an output end of the OR gate circuit 43 is connected to the second switch transistor Q2. It may be understood that, the first AND gate circuit 41 may be an existing AND gate circuit, the OR gate circuit 43 may be an existing OR gate circuit, and specific circuit structures of which will not be elaborated herein.

In this embodiment, the logic control module 40 is configured to output the first driving signal having a low level through the OR gate circuit 43 to control the second switch transistor Q2 to be turned on, when the preset pulse signal has a low level and the first digital signal having a low level is output at the connection node between the power supply V and the second conduction electrode. The logic module 40 is configured to output the second driving signal having a high level through the first AND gate circuit 41 to control the first switch transistor Q1 to be turned on, when the preset pulse signal has a high level and the second digital signal having a high level is output at the connection node between the power supply V and the second conduction electrode.

It should be noted that, according to the operating characteristics of the AND gate circuit and the OR gate circuit, since the first switch transistor Q1 is turned on under driving of a high level driving signal and the second switch transistor Q2 is turned on under driving of a low level driving signal, the first AND gate circuit 41 cannot drive the first switch transistor Q1 connected to the first AND gate circuit 41 to be turned on by outputting a driving signal having a low level, when the first AND gate circuit 41 receives the first digital signal having a low level and the preset pulse signal having a low level. Likewise, the OR gate circuit 43 cannot drive the second switch transistor Q2 connected to the OR gate circuit 43 to be turned on by outputting a driving signal having a high level, when the OR gate circuit 43 receives the second digital signal having a high level and the preset pulse signal having a high level. Accordingly, only one of the first switch transistor Q1 and the second switch transistor Q2 can be turned on at any moment, while the other of the first switch transistor Q1 and the second switch transistor Q2 is cut off. In this way, the logic control module 40 can output the first driving signal and the second driving signal periodically to drive the first switch transistor Q1 and the second switch transistor Q2 to be turned on alternately.

It may be understood that, in another possible embodiment, when the first digital signal has a high level and the first level is a high level (i.e., the preset pulse signal has a high level), the logic control module 40 outputs the first driving signal to control the first switch transistor Q1 to be turned on. When the second digital signal has a low level and the second level is a low level (i.e., the preset pulse signal has a low level), the logic control module 40 outputs the second driving signal to control the second switch transistor Q2 to be turned on. In this way, the first switch transistor Q1 and the second switch transistor Q2 can be turned on alternately.

Figure 6:
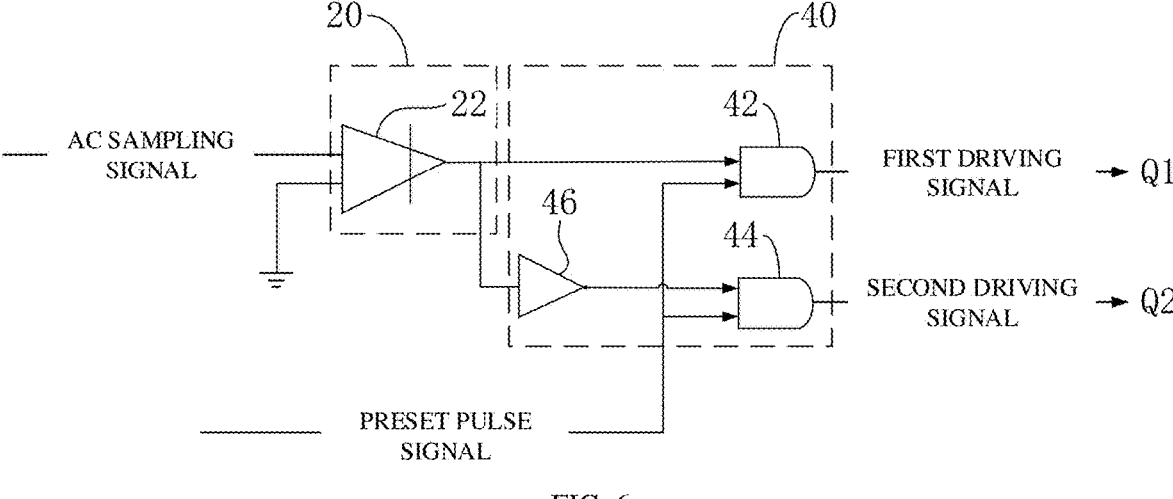
FIG. 6 is a diagram of a circuit structure of the control circuit illustrated in FIG. 3 in another embodiment.

Exemplarily, reference is made to FIG. 6, in another possible embodiment, the polarity determination module 20 may include a comparator 22. The comparator 22 has one input end configured to receive the sampling signal, and has the other input end for grounding. According to a working principle of the comparator, the comparator 22 outputs the first digital signal having a high level when the sampling signal is a positive voltage signal. On the contrary, the comparator 22 outputs the second digital signal having a low level when the sampling signal is a negative voltage signal. As illustrated in FIG. 6, the logic control module 40 may include a second AND gate circuit 42, a third AND gate circuit 44, and an inverter 46. One input end of the second AND gate circuit 42 is connected to an output end of the comparator 22, the other input end of the second AND gate circuit 42 is configured to receive the preset pulse signal. An input end of the inverter 46 is connected to an output end of the comparator 22, an output end of the inverter 46 is connected to one input end of the third AND gate circuit 44, and the other input end of the third AND gate circuit 44 is configured to receive the preset pulse signal. In doing this, when the preset pulse signal has a high level and the comparator 22 outputs the first digital signal having a high level, the logic control module 40 outputs the first driving signal having a high level through the second AND gate circuit 42 to control the first switch transistor Q1 to be turned on. When the preset pulse signal has a low level and the comparator 22 outputs the second digital signal having a low level, the inverter 46 transforms the second digital signal having a low level into a digital signal having a high level, and the third AND gate circuit 44 receives the digital signal having a high level and the preset pulse signal having a low level and outputs the second driving signal having a low level, so that the logic control module 40 can output the second driving signal having a low level through the third AND gate circuit 44 to control the second switch transistor Q2 to be turned on.

It should be noted that, the output end of the comparator 22 is connected to a logic allocation module (not illustrated in the drawings). The logic allocation module is configured to allocate the first digital signal having a high level to the second AND gate circuit 42, and is also configured to allocate the second digital signal having a low level to the inverter 46. The logic allocation module may be an existing logic allocation circuit, specific structure of which will not be elaborated herein.

In conclusion, in the power supply system 100 provided in embodiments of the disclosure, the control circuit 7 receives the sampling signal of the AC input voltage AC of the bridgeless PFC circuit 1 collected by the sampling circuit 3 and the preset pulse signal generated by the digital control chip 5. In this way, the polarity of the AC input voltage AC of the bridgeless PFC circuit 1 can be determined automatically, and different driving signals are output to the bridgeless PFC circuit 1 according to different polarities of the AC input voltage AC. In this way, the first switch transistor Q1 and the second switch transistor Q2 in the bridgeless PFC circuit 1 can be controlled to be alternately turned on, and the bridgeless PFC circuit 1 can operate normally. Not only the control algorithm of the digital control chip 5 can be simplified so as to improve the response speed of the bridgeless PFC circuit 1, but also the control circuit 7 only includes the polarity determination module 20 and the logic control module 40, which is simple in structure and is highly reliable. Further, the polarity determination module 20 and the logic control module 40 of the control circuit 7 may have different composition structures, so that the design of the control circuit 7 may be diverse and flexible.

Further, reference is made to FIG. 7, the disclosure also provides a control method for the bridgeless PFC circuit 1. The control method may be applied to the control circuit 7 of any embodiments mentioned above. Specifically, as illustrated in FIG. 7, the control method includes the following operations.

At S1, reference is made to FIG. 4, with the polarity determination module 20, the sampling signal of the AC input voltage AC of the bridgeless PFC circuit 1 is received, the first digital signal is output when the sampling signal is a positive voltage signal, and the second digital signal is output when the sampling signal is a negative voltage signal. The level polarity of the first digital signal and is opposite to the level polarity of the second digital signal.

At S2, with the logic control module 40, the preset pulse signal, the first digital signal, and the second digital signal are received, the first driving signal is output to the bridgeless PFC circuit 1 when receiving the first digital signal and the preset pulse signal having a first level, and the second driving signal is output to the bridgeless PFC circuit 1 when receiving the second digital signal and the preset pulse signal having a second level. The first driving signal is used for controlling one of the first switch transistor Q1 and the second switch transistor Q2 of the bridgeless PFC circuit 1 to be turned on. The second driving signal is used for controlling the other of the first switch transistor Q1 and the second switch transistor Q2 to be turned on. The first level and the second level are opposite and change periodically. Specifically, the changing period of the first level and the second level is the same as the changing period of the polarity of the AC input voltage AC.

In the control method provided in embodiments of the disclosure, since the first digital signal and the second digital signal output by the polarity determination module 20 are associated with the polarity of the AC input voltage AC of the bridgeless PFC circuit 1, i.e., the polarity determination module 20 can periodically output the first digital signal and the second digital signal according to the changing of the polarity of the AC input voltage AC, and the logic control module 40 receives the first digital signal and the second digital signal periodically. Moreover, the level (namely, the first level and the second level) of the preset pulse signal changes periodically, and the changing period of the first level and the second level is the same as the changing period of the polarity of the AC input voltage AC. Therefore, the logic control module 40 periodically outputs the first driving signal and the second driving signal according to the received preset pulse signal and the digital signal (the first digital signal or the second digital signal). The first driving signal and the second driving signal are used for respectively controlling different switch transistors in the bridgeless PFC circuit 1 to be turned on. That is, the control circuit 7 can output different driving signals to separately control different switch transistors in the bridgeless PFC circuit 1 to be turned on alternately, enabling the bridgeless PFC circuit 1 to operate normally.

Compared to the method of using a digital control chip to distinguish different polarities of the AC input voltage of the bridgeless PFC circuit to output different driving signals to drive different switch transistors of the bridgeless PFC circuit to be turned on, in the control method provided in embodiments of the disclosure, the control circuit 7 receives the sampling signal of the AC input voltage AC of the bridgeless PFC circuit 1 and the preset pulse signal having a level that changes periodically according to the changing period of the polarity of the AC input voltage AC. In this way, the polarity of the AC input voltage AC of the bridgeless PFC circuit 1 can be determined automatically, and different driving signals are output to the bridgeless PFC circuit 1 according to different polarities of the AC input voltage AC. In this way, the first switch transistor Q1 and the second switch transistor Q2 in the bridgeless PFC circuit 1 can be controlled to be alternately turned on, and the bridgeless PFC circuit 1 can operate normally. Not only the control algorithm of the digital control chip 5 corresponding to the bridgeless PFC circuit 1 can be simplified so as to improve the response speed of the bridgeless PFC circuit 1, but also the control circuit 7 only includes the polarity determination module 20 and the logic control module 40, which is simple in structure and is highly reliable.

Optionally, in a possible embodiment, the first switch transistor Q1 is configured to be turned on under control of a driving signal having a high level. The second switch transistor Q2 is configured to be turned on under control of a driving signal having a low level.

At S2, the operation that the first driving signal is used for controlling one of the first switch transistor Q1 and the second switch transistor Q2 of the bridgeless PFC circuit 1 to be turned on specifically includes the following. The first driving signal output by the logic control module 40 is used for controlling the second switch transistor Q2 to be turned on, when the first digital signal has a low level and the first level is a low level.

At S2, the operation that the second driving signal is used for controlling the other of the first switch transistor Q1 and the second switch transistor Q2 to be turned on specifically includes the following. The second driving signal output by the logic control module 40 is used for controlling the first switch transistor Q1 to be turned on, when the second digital signal has a high level and the second level is a high level.

More specifically, reference is made to FIG. 5, in an embodiment of the disclosure, the polarity determination module 20 may include the voltage division circuit 21, the third switch transistor Q3, and the power supply V. The voltage division circuit 21 has the first connection end configured to receive the sampling signal, and has second connection end for grounding. The voltage division circuit 21 includes the voltage division element. The third switch transistor Q3 includes the control electrode, the first conduction electrode, and the second conduction electrode. The control electrode is connected to the first connection end (the end that is connected to the sampling signal) of the voltage division element and the first conduction electrode is connected to the second connection end (the end that is grounded) of the voltage division element. The power supply V is connected between the second conduction electrode and the ground, and the connection node between the power supply V and the second conduction electrode is connected to the logic control module 40.

In the embodiment illustrated in FIG. 5, when the sampling signal is a positive voltage signal, a voltage between two opposite ends of the voltage division element may be higher than a voltage of the turn-on threshold of the third switch transistor Q3. In this case, the third switch transistor Q3 is turned on, and the voltage of the power supply V may be directed to the ground through the turned-on third switch transistor Q3, and thus a low level signal may be output at the connection node between the power supply V and the second conduction electrode to the logic control module 40. The low-level signal is the first digital signal. On the contrary, when the sampling signal is a negative voltage signal, the voltage between two opposite ends of the voltage division element may be lower than the voltage of the turn-on threshold of the third switch transistor Q3. In this case, the third switch transistor Q3 is cut off, and the voltage of the power supply V may not be directed to the ground through the cut-off third switch transistor Q3, and thus a high level signal may be output at the connection node between the power supply V and the second conduction electrode to the logic control module 40. The high-level signal is the second digital signal.

Reference is again made to FIG. 5, in an embodiment of the disclosure, the logic control module 40 may specifically include the first AND gate circuit 41 and the OR gate circuit 43. One input end of the first AND gate circuit 41 and one input end of the OR gate circuit 43 are connected to the connection node between the power supply V and the second conduction electrode of the third switch transistor Q3, and the other input end of the first AND gate circuit 41 and the other input end of the OR gate circuit 43 are configured to receive the preset pulse signal. An output end of the first AND gate circuit 41 is connected to the first switch transistor Q1, and an output end of the OR gate circuit 43 is connected to the second switch transistor Q2. It may be understood that, the first AND gate circuit 41 may be an existing AND gate circuit, the OR gate circuit 43 may be an existing OR gate circuit, and specific circuit structures of which will not be elaborated herein.

As such, the logic control module 40 is configured to output the first driving signal having a low level through the OR gate circuit 43 to control the second switch transistor Q2 to be turned on, when the preset pulse signal has a low level and the first digital signal having a low level is output at the connection node between the power supply V and the second conduction electrode. The logic module 40 is configured to output the second driving signal having a high level through the first AND gate circuit 41 to control the first switch transistor Q1 to be turned on, when the preset pulse signal has a high level and the second digital signal having a high level is output at the connection node between the power supply V and the second conduction electrode.

According to the operating characteristics of the AND gate circuit and the OR gate circuit, since the first switch transistor Q1 is turned on under driving of a high level driving signal and the second switch transistor Q2 is turned on under driving of a low level driving signal, the first AND gate circuit 41 cannot drive the first switch transistor Q1 connected to the first AND gate circuit 41 to be turned on by outputting a driving signal having a low level, when the first AND gate circuit 41 receives the first digital signal having a low level and the preset pulse signal having a low level. Likewise, the OR gate circuit 43 cannot drive the second switch transistor Q2 connected to the OR gate circuit 43 to be turned on by outputting a driving signal having a high level, when the OR gate circuit 43 receives the second digital signal having a high level and the preset pulse signal having a high level. Accordingly, only one of the first switch transistor Q1 and the second switch transistor Q2 can be turned on at any moment, while the other is cut off. In this way, the logic control module 40 can output the first driving signal and the second driving signal periodically to drive the first switch transistor Q1 and the second switch transistor Q2 to be turned on alternately.

In the above embodiment, the voltage division circuit 21 includes multiple resistors connected in series. Optionally, the voltage division element is one of the resistor among the multiple resistors, or is at least two adjacent resistors among the multiple resistors. Optionally, the polarity determination module 20 may be configured to protect the voltage regulator ZD1 and/or the current-limiting element of the third switch transistor Q3. Specific description may be referred to the above content of the control circuit 7, which will not be repeated herein.

Optionally, in another possible embodiment, when the first digital signal has a high level and the first level is a high level (i.e., the preset pulse signal has a high level), the logic control module 40 outputs the first driving signal to control the first switch transistor Q1 to be turned on. When the second digital signal has a low level and the second level is a low level (i.e., the preset pulse signal has a low level), the logic control module 40 outputs the second driving signal to control the second switch transistor Q2 to be turned on. In this way, the first switch transistor Q1 and the second switch transistor Q2 may be turned on alternately.

Exemplarily, reference is made to FIG. 6, in another possible embodiment, the polarity determination module 20 may include a comparator 22. The comparator 22 has one input end configured to receive the sampling signal, and has the other input end configured for grounding. According to the working principle of the comparator, the comparator 22 outputs the first digital signal having a high level when the sampling signal is a positive voltage signal. On the contrary, the comparator 22 outputs the second digital signal having a low level when the sampling signal is a negative voltage signal. As illustrated in FIG. 6, the logic control module 40 may include a second AND gate circuit 42, a third AND gate circuit 44, and an inverter 46. One input end of the second AND gate circuit 42 is connected to an output end of the comparator 22, the other input end of the second AND gate circuit 42 is configured to receive the preset pulse signal. An input end of the inverter 46 is connected to the output end of the comparator 22, an output end of the inverter 46 is connected to one input end of the third AND gate circuit 44, and the other input end of the third AND gate circuit 44 is configured to receive the preset pulse signal. In doing this, when the preset pulse signal has a high level and the comparator 22 outputs the first digital signal having a high level, the logic control module 40 outputs the first driving signal having a high level through the second AND gate circuit 42 to control the first switch transistor Q1 to be turned on. When the preset pulse signal has a low level and the comparator 22 outputs the second digital signal having a low level, the inverter 46 transforms the second digital signal having a low level into a digital signal having a high level, and the third AND gate circuit 44 receives the digital signal having a high level and the preset pulse signal having a low level and outputs the second driving signal having a low level, so that the logic control module 40 can output the second driving signal having a low level through the third AND gate circuit 44 to control the second switch transistor Q2 to be turned on.

It should be noted that, the output end of the comparator 22 is connected to a logic allocation module (not illustrated in the drawings). The logic allocation module is configured to allocate the first digital signal having a high level to the second AND gate circuit 42, and is configured to allocate the second digital signal having a low level to the inverter 46. The logic allocation module may be an existing logic allocation circuit, specific structure of which will not be elaborated herein.

It may be understood that, the control circuit to which the control method provided in the disclosure is applied may be the control circuit 7 of any of the above embodiments. Therefore, the control method at least possesses all the beneficial effects brought by the technical solution of the above embodiments, which will not be repeated herein.

The reference terms "embodiment", "specific embodiments", or "exemplarily" referred to herein means that a particular feature, structure, material, or characteristic described in conjunction with the embodiment or implementation may be contained in at least one embodiment or implementation of the present disclosure. In the specification, the illustrative expression of the above terms does not necessarily refer to the same embodiment or implementation. Moreover, the particular feature, structure, material, or characteristic described may be properly combined in any one or more embodiments or implementations.

Although the embodiments of the disclosure have been shown and described, those of ordinary skill in the art may understand that, multiple changes, modifications, equivalent arrangements, and variants can be made within the principles and purposes of the disclosure, and the scope of protection of the disclosure is limited by the claims and their equivalents.

What is claimed is:

1. A control circuit for a bridgeless power factor correction (PFC) circuit, wherein the bridgeless PFC circuit comprises a first bridge arm, the first bridge arm comprises a first switch transistor and a second switch transistor that are connected in series, the first switch transistor is configured to be turned on under control of a driving signal having a high level, and the second switch transistor is configured to be turned on under control of a driving signal having a low level; and the control circuit comprises a polarity determination module and a logic control module, wherein the polarity determination module comprises a voltage division circuit, a third switch transistor, and a power supply; the voltage division circuit has a first connection end configured to receive a sampling signal of an alternating current (AC) input voltage of the bridgeless PFC circuit, the voltage division circuit has a second connection end for grounding, and the voltage division circuit comprises a voltage division element; the third switch transistor comprises a control electrode, a first conduction electrode, and a second conduction electrode; the control electrode is connected to a first connection end of the voltage division element and the first conduction electrode is connected to a second connection end of the voltage division element, the power supply is connected between the second conduction electrode and a ground, and a connection node between the power supply and the second conduction electrode is connected to the logic control module; when the sampling signal is a positive voltage signal, the third switch transistor is turned on, and a first digital signal having a low level is output at the connection node between the power supply and the second conduction electrode; when the sampling signal is a negative voltage signal, the third switch transistor is cut off, and a second digital signal having a high level is output at the connection node between the power supply and the second conduction electrode; and the logic control module is configured to receive a preset pulse signal, the first digital signal, and the second digital signal; the logic control module is configured to output a first driving signal to the bridgeless PFC circuit to control the second switch transistor to be turned on, when receiving the first digital signal and the preset pulse signal having a low level, and the logic control module is configured to output a second driving signal to the bridgeless PFC circuit to control the first switch transistor to be turned on, when receiving the second digital signal and the preset pulse signal having a high level; and a changing period of a level of the preset pulse signal is the same as a changing period of a polarity of the AC input voltage.

2. The control circuit for the bridgeless PFC circuit of claim 1, wherein the logic control module comprises an AND gate circuit and an OR gate circuit, one input end of the AND gate circuit and one input end of the OR gate circuit are connected to the connection node between the power supply and the second conduction electrode, and an other input end of the AND gate circuit and an other input end of the OR gate circuit are configured to receive the preset pulse signal; an output end of the AND gate circuit is connected to the first switch transistor, and an output end of the OR gate circuit is connected to the second switch transistor; and the logic control module is configured to output the first driving signal having a low level through the OR gate circuit to control the second switch transistor to be turned on, when the preset pulse signal has a low level and the first digital signal having a low level is output at the connection node between the power supply and the second conduction electrode; the logic control module is configured to output the second driving signal having a high level through the AND gate circuit to control the first switch transistor to be turned on, when the preset pulse signal has a high level and the second digital signal having a high level is output at the connection node between the power supply and the second conduction electrode.

3. The control circuit for the bridgeless PFC circuit of claim 1, wherein the voltage division circuit comprises a plurality of resistors connected in series, the voltage division element is a resistor among the plurality of resistors, or the voltage division element is at least two adjacent resistors among the plurality of resistors.

4. The control circuit for the bridgeless PFC circuit of claim 1, wherein the polarity determination module further comprises a voltage regulator, the voltage regulator has a first voltage end connected between the first connection end of the voltage division element and the control electrode of the third switch transistor, and the voltage regulator has a second voltage end connected between the second connection end of the voltage division element and the first conduction electrode of the third switch transistor.

5. The control circuit for the bridgeless PFC circuit of claim 1, wherein the polarity determination module further comprises a current-limiting element, and the current-limiting element is connected between the power supply and the second conduction electrode of the third switch transistor.

6. A control method for a bridgeless power factor correction (PFC) circuit, wherein the control method is applied to a control circuit for the bridgeless PFC circuit, wherein the bridgeless PFC circuit comprises a first bridge arm, the first bridge arm comprises a first switch transistor and a second switch transistor that are connected in series, the first switch transistor is configured to be turned on under control of a driving signal having a high level, and the second switch transistor is configured to be turned on under control of a driving signal having a low level; and the control circuit comprises a polarity determination module and a logic control module, wherein the polarity determination module comprises a voltage division circuit, a third switch transistor, and a power supply; the voltage division circuit has a first connection end configured to receive a sampling signal of an alternating current (AC) input voltage of the bridgeless PFC circuit, the voltage division circuit has a second connection end for grounding, and the voltage division circuit comprises a voltage division element; the third switch transistor comprises a control electrode, a first conduction electrode, and a second conduction electrode; the control electrode is connected to a first connection end of the voltage division element and the first conduction electrode is connected to a second connection end of the voltage division element, the power supply is connected between the second conduction electrode and a ground, and a connection node between the power supply and the second conduction electrode is connected to the logic control module; when the sampling signal is a positive voltage signal, the third switch transistor is turned on, and a first digital signal having a low level is output at the connection node between the power supply and the second conduction electrode; when the sampling signal is a negative voltage signal, the third switch transistor is cut off, and a second digital signal having a high level is output at the connection node between the power supply and the second conduction electrode; and the logic control module is configured to receive a preset pulse signal, the first digital signal, and the second digital signal; the logic control module is configured to output a first driving signal to the bridgeless PFC circuit to control the second switch transistor to be turned on, when receiving the first digital signal and the preset pulse signal having a low level, and the logic control module is configured to output a second driving signal to the bridgeless PFC circuit to control the first switch transistor to be turned on, when receiving the second digital signal and the preset pulse signal having a high level; and a changing period of a level of the preset pulse signal is the same as a changing period of a polarity of the AC input voltage; wherein the control method comprises: receiving, with the polarity determination module, the sampling signal of the AC input voltage of the bridgeless PFC circuit; outputting the first digital signal having a low level when the sampling signal is a positive voltage signal, and outputting the second digital signal having a high level when the sampling signal is a negative voltage signal; and receiving, with the logic control module, the preset pulse signal, the first digital signal, and the second digital signal; outputting the first driving signal to the bridgeless PFC circuit to control the second switch transistor to be turned on, when receiving the first digital signal and the preset pulse signal having a low level, and outputting the second driving signal to the bridgeless PFC circuit to control the first switch transistor to be turned on, when receiving the second digital signal and the preset pulse signal having a high level; and the level polarity of the preset pulse signal changes periodically.

7. A power supply system, comprising a bridgeless power factor correction (PFC) circuit, wherein the bridgeless PFC circuit comprises a first bridge arm, the first bridge arm comprises a first switch transistor and a second switch transistor that are connected in series, the first switch transistor is configured to be turned on under control of a driving signal having a high level, and the second switch transistor is configured to be turned on under control of a driving signal having a low level a control circuit, wherein the control circuit comprises a polarity determination module and a logic control module, wherein the polarity determination module comprises a voltage division circuit, a third switch transistor, and a power supply; the voltage division circuit has a first connection end configured to receive a sampling signal of an alternating current (AC) input voltage of the bridgeless PFC circuit, the voltage division circuit has a second connection end for grounding, and the voltage division circuit comprises a voltage division element; the third switch transistor comprises a control electrode, a first conduction electrode, and a second conduction electrode; the control electrode is connected to a first connection end of the voltage division element and the first conduction electrode is connected to a second connection end of the voltage division element, the power supply is connected between the second conduction electrode and a ground, and a connection node between the power supply and the second conduction electrode is connected to the logic control module; when the sampling signal is a positive voltage signal, the third switch transistor is turned on, and a first digital signal having a low level is output at the connection node between the power supply and the second conduction electrode; when the sampling signal is a negative voltage signal, the third switch transistor is cut off, and a second digital signal having a high level is output at the connection node between the power supply and the second conduction electrode; and the logic control module is configured to receive a preset pulse signal, the first digital signal, and the second digital signal; the logic control module is configured to output a first driving signal to the bridgeless PFC circuit to control the second switch transistor to be turned on, when receiving the first digital signal and the preset pulse signal having a low level, and the logic control module is configured to output a second driving signal to the bridgeless PFC circuit to control the first switch transistor to be turned on, when receiving the second digital signal and the preset pulse signal having a high level; and a changing period of a level of the preset pulse signal is the same as a changing period of a polarity of the AC input voltage; a sampling circuit, configured to collect the sampling signal of the AC input voltage of the bridgeless PFC circuit and send the sampling signal to the polarity determination module; a digital control chip, configured to generate the preset pulse signal and send the preset pulse signal to the logic control module.

\* \* \* \* \*